United States Patent
Liu et al.

(10) Patent No.: US 7,897,207 B2
(45) Date of Patent: Mar. 1, 2011

(54) NANO-MOLECULAR SIEVE-POLYMER MIXED MATRIX MEMBRANES WITH SIGNIFICANTLY IMPROVED GAS SEPARATION PERFORMANCE

(75) Inventors: Chunqing Liu, Schaumburg, IL (US); Stephen T. Wilson, Libertyville, IL (US)

(73) Assignee: UOP LLC, Des Plaines, IL (US)

( * ) Notice: Subject to any disclaimer, the term of this patent is extended or adjusted under 35 U.S.C. 154(b) by 981 days.

(21) Appl. No.: 11/679,155

(22) Filed: Feb. 26, 2007

(65) Prior Publication Data

US 2007/0209514 A1    Sep. 13, 2007

Related U.S. Application Data

(60) Provisional application No. 60/781,297, filed on Mar. 10, 2006.

(51) Int. Cl.
  *B05D 5/00* (2006.01)
(52) U.S. Cl. ......... 427/244; 427/216; 427/271; 427/273; 427/535; 96/4
(58) Field of Classification Search .......... 427/244, 427/216, 271, 273, 535; 96/4
See application file for complete search history.

(56) References Cited

U.S. PATENT DOCUMENTS

| | | | |
|---|---|---|---|
| 3,567,632 A | 3/1971 | Richter et al. | 210/23 |
| 4,230,463 A | 10/1980 | Henis et al. | 55/16 |
| 4,705,540 A | 11/1987 | Hayes et al. | 55/16 |
| 4,728,345 A | 3/1988 | Murphy | 55/158 |
| 4,740,219 A | 4/1988 | Kulprathipanja et al. | 155/16 |
| 4,880,442 A | 11/1989 | Hayes et al. | 55/16 |
| 4,925,459 A | 5/1990 | Rojey et al. | 155/16 |
| 4,968,430 A | 11/1990 | Hildenbrand et al. | 210/640 |
| 5,085,676 A | 2/1992 | Ekiner et al. | 55/158 |
| 5,104,532 A | 4/1992 | Thompson et al. | 210/224 |
| 5,127,925 A | 7/1992 | Kulprathipanja et al. | 55/16 |
| 5,288,304 A | 2/1994 | Koros et al. | 95/45 |
| 5,431,864 A | 7/1995 | Rao et al. | 264/29.5 |
| 5,447,559 A | 9/1995 | Rao et al. | 96/4 |
| 5,507,856 A | 4/1996 | Rao et al. | 95/50 |
| 5,538,536 A | 7/1996 | Fuentes et al. | 95/45 |
| 5,935,646 A * | 8/1999 | Raman et al. | 427/244 |
| 6,048,388 A | 4/2000 | Schwarz | 106/31.27 |

(Continued)

FOREIGN PATENT DOCUMENTS

EP    1 188 477 A1    3/2002

(Continued)

OTHER PUBLICATIONS

Vu et al., Journal of Membrane Science, vol. 211, pp. 311-334 (2003).*

(Continued)

*Primary Examiner* — Peter D. Mulcahy
*Assistant Examiner* — Henry Hu
(74) *Attorney, Agent, or Firm* — Mark Goldberg

(57) ABSTRACT

Nano-molecular sieve-polymer mixed matrix membranes (MMMs) for $CO_2$ removal from natural gas have been prepared by incorporating dispersible template-free nano-molecular sieves into polymer matrices such as Matrimid 5218 polyimide matrix or Ultem 1000 polyetherimide matrix. The nano-molecular sieves used in this invention include template-free nano-AlPO-18, nano-AlPO-5, nano-Silicalite, nano-SAPO-34, and PEG-functionalized nano-Silicalite. These template-free nano-molecular sieves were synthesized by an organic ligand grafting method.

9 Claims, 2 Drawing Sheets

U.S. PATENT DOCUMENTS

| | | | |
|---|---|---|---|
| 6,248,682 B1 | 6/2001 | Thoompson et al. | 502/4 |
| 6,500,233 B1 | 12/2002 | Miller et al. | 95/50 |
| 6,503,295 B1 | 1/2003 | Koros et al. | 95/51 |
| 6,508,860 B1 | 1/2003 | Kulkarni et al. | 95/51 |
| 6,562,110 B2 | 5/2003 | Koros et al. | 96/4 |
| 6,579,343 B2 | 6/2003 | Brennecke et al. | 95/51 |
| 6,585,802 B2 | 7/2003 | Koros et al. | 95/51 |
| 6,605,140 B2 | 8/2003 | Fuiver et al. | 96/4 |
| 6,626,980 B2 | 9/2003 | Hasse et al. | 95/51 |
| 6,663,805 B1 | 12/2003 | Ekiner et al. | 264/45.9 |
| 6,726,744 B2 | 4/2004 | Kulprathipanja et al. | 95/45 |
| 6,740,143 B2 | 5/2004 | Corbin et al. | 96/11 |
| 6,755,900 B2 | 6/2004 | Koros et al. | 96/11 |
| 6,863,983 B2 | 3/2005 | Tsapatsis et al. | 428/446 |
| 6,932,859 B2 | 8/2005 | Koros et al. | 96/10 |
| 6,946,015 B2 | 9/2005 | Jorgensen et al. | 95/51 |
| 6,997,971 B1 | 2/2006 | Young et al. | 95/45 |
| 7,025,804 B2 | 4/2006 | Simmons et al. | 95/51 |
| 7,109,140 B2 | 9/2006 | Marand et al. | 502/4 |
| 7,138,006 B2 | 11/2006 | Miller et al. | 95/45 |
| 7,166,146 B2 | 1/2007 | Miller et al. | 95/45 |
| 7,485,173 B1 * | 2/2009 | Liu et al. | 95/45 |
| 2002/0053284 A1 | 5/2002 | Koros et al. | 95/51 |
| 2003/0152759 A1* | 8/2003 | Chao et al. | 428/307.3 |
| 2003/0220188 A1 | 11/2003 | Marand et al. | 592/60 |
| 2004/0107830 A1 | 6/2004 | Simmons et al. | 95/45 |
| 2004/0147796 A1 | 7/2004 | Roman et al. | 585/144 |
| 2004/0167014 A1* | 8/2004 | Yan et al. | 502/101 |
| 2005/0043167 A1 | 2/2005 | Miller et al. | 502/4 |
| 2005/0139066 A1 | 6/2005 | Miller et al. | 95/45 |
| 2005/0230305 A1 | 10/2005 | Kulkarni et al. | 210/500.23 |
| 2005/0268782 A1 | 12/2005 | Kulkarni et al. | 96/4 |
| 2006/0107830 A1 | 5/2006 | Miller et al. | 95/45 |
| 2006/0117949 A1 | 6/2006 | Kulkarni et al. | 95/45 |
| 2007/0022877 A1 | 2/2007 | Marand et al. | 95/51 |
| 2007/0184557 A1* | 8/2007 | Crudden et al. | 436/171 |

FOREIGN PATENT DOCUMENTS

| | | |
|---|---|---|
| WO | WO 2007/007051 A1 | 1/2007 |
| WO | WO-2008/066939 A1 * | 6/2008 |
| WO | WO-2008/066939 A2 * | 6/2008 |

OTHER PUBLICATIONS

Moermans et al., Chem. Commun., pp. 2467-2468 (2000).*
Wang et al., Journal of Mater. Chem., vol. 12, pp. 3640-3643 (2002).*
Yong et al., Journal of Membrane Science, vol. 188, pp. 151-163 (2001).*
Smaihi et al., Journal of Mater. Chem., vol. 14, pp. 1347-1351 (2004).*
Robeson, J. Membr. Sci., 62: 165 (1991).
Robeson, Curr. Opin. Solid State Mater. Sci., 4: 549 (1999).
Zimmerman, et al., J. Membr. Sci., 137: 145 (1997).

* cited by examiner

NANO-MOLECULAR SIEVE-POLYMER MIXED MATRIX MEMBRANES WITH SIGNIFICANTLY IMPROVED GAS SEPARATION PERFORMANCE

CROSS-REFERENCE TO RELATED APPLICATION

This application claims priority from Provisional Application Ser. No. 60/781,297 filed Mar. 10, 2006, the contents of which are hereby incorporated by reference.

BACKGROUND OF THE INVENTION

Gas separation processes with membranes have undergone a major evolution since the introduction of the first membrane-based industrial hydrogen separation process about two decades ago. The design of new materials and efficient methods will further advance the membrane gas separation processes within the next decade.

The gas transport properties of many glassy and rubbery polymers have been measured, driven by the search for materials with high permeability and high selectivity for potential use as gas separation membranes. Unfortunately, an important limitation in the development of new membranes for gas separation applications is the well-known trade-off between permeability and selectivity, as first shown by Robeson. See Robeson, J. MEMBR. SCI., 62: 165 (1991); Robeson, CURR. OPIN. SOLID STATE MATER. SCI, 4: 549 (1999). By comparing the data of hundreds of different polymers, he demonstrated that selectivity and permeability seem to be inseparably linked to one another, in a relation where selectivity increases as permeability decreases and vice versa.

Despite concentrated efforts to tailor polymer structure to affect separation properties, current polymeric membrane materials have seemingly reached a limit in the tradeoff between productivity and selectivity. See Zimmerman, et al., J. MEMBR. SCI, 137: 145 (1997). For example, many polyimide and polyetherimide glassy polymers such as Ultem 1000 have much higher intrinsic $CO_2/CH_4$ selectivities ($\sim$30 at 50° C. and 100 psig) than that of cellulose acetate (CA, ~22), which are more attractive for practical gas separation applications. These polymers, however, do not have outstanding permeabilities attractive for commercialization compared to current UOP Separex CA membrane product, completely in agreement with the Robeson trade-off relation.

Our previous study has shown that nano-molecular sieves such as poly(ethylene glycol) (PEG)-functionalized nano-Silicalite or nano-SAPO-34 dispersed in CA-based mixed matrix membranes (MMM) can enhance the $CO_2$ permeability over the intrinsic $CO_2$ permeability of the pure CA polymer matrix, and in the meantime the $CO_2/CH_4$ selectivity ($\alpha_{CO2/CH4}$) remained almost the same as that of CA polymer matrix. The $\alpha_{CO2/CH4}$ of nano-molecular sieve-CA MMM films (<22), however, is still not high enough for the next generation of UOP Separex membrane product for $CO_2$ removal from natural gas.

Therefore, the aim of the present invention is to prepare nano-molecular sieve-polymer MMM membranes to achieve higher $\alpha_{CO2/CH4}$ than that of CA membrane with at least higher than 5 barrer $CO_2$ permeability, which is promising for practical application. We studied the use of template-free nano-molecular sieves, such as template-free nano-Silicalite, nano-AlPO-18, nano-SAPO-34, and PEG-functionalized nano-Silicalite, as the dispersed phase in MMM films using Matrimid 5218 and Ultem 1000 continuous polymer matrices. Experimental pure gas permeation results demonstrated significantly improved $CO_2/CH_4$ separation properties.

SUMMARY OF THE INVENTION

In this invention, new nano-molecular sieve-polymer MMMs for $CO_2$ removal from natural gas have been prepared by incorporating dispersible template-free nano-molecular sieves into polymer matrices such as Matrimid 5218 polyimide matrix or Ultem 1000 polyetherimide matrix. The nano-molecular sieves used in this invention include template-free nano-AlPO-18, nano-AlPO-14, nano-AlPO-34, nano-UZM-25, nano-CDS-1, nano-Nu-6(2), nano-AlPO-25, nano-AlPO-5, nano-Silicalite, and nano-SAPO-34. These dispersible template-free nano-molecular sieves were synthesized by an organic ligand-grafting-calcination method.

For nano-AlPO-18-Ultem mixed matrix membrane (MMM) containing 40 wt-% of template-free nano-AlPO-18 molecular sieve particles, pure gas permeation test results show simultaneously improved $CO_2/CH_4$ selectivity by 19% and $CO_2$ permeability by about 250% over the pure Ultem polymer membrane.

For nano-SAPO-34-Ultem MMM with 30 wt-% of template-free nano-SAPO-34 loading, pure gas permeation tests show both improved $CO_2$ permeability (2.58 barrer) and $CO_2/CH_4$ selectivity (34.9) compared to the intrinsic $CO_2$ permeability (1.95 barrer) and $CO_2/CH_4$ selectivity (30.3) of the pure Ultem polymer matrix. For nano-Silicalite-Ultem MMM film with 30 wt-% of template-free nano-Silicalite loading, pure gas permeation tests show significant enhancement by as much as 260% in $CO_2$ permeability over the intrinsic $CO_2$ permeability of the pure Ultem polymer matrix with equal $CO_2/CH_4$ selectivity. Likewise, for nano-Silicalite-Matrimid MMM with 30 wt-% of template-free nano-Silicalite loading, enhancement by as much as 93% in $CO_2$ permeability and slightly increased $CO_2/CH_4$ selectivity were observed.

These nano-AlPO-18-Ultem, nano-SAPO-34-Ultem, nano-Silicalite-Ultem and nano-Silicalite-Matrimid MMMs have significantly improved performance with outstanding permeabilities and high $CO_2/CH_4$ selectivities (>29) compared to current Separex CA membrane (~22 CO2/$CH_4$ selectivity) for $CO_2$ removal from natural gas, which makes them very promising membrane candidates for $CO_2$ removal from natural gas.

DETAILED DESCRIPTION OF THE INVENTION

Figure 1:
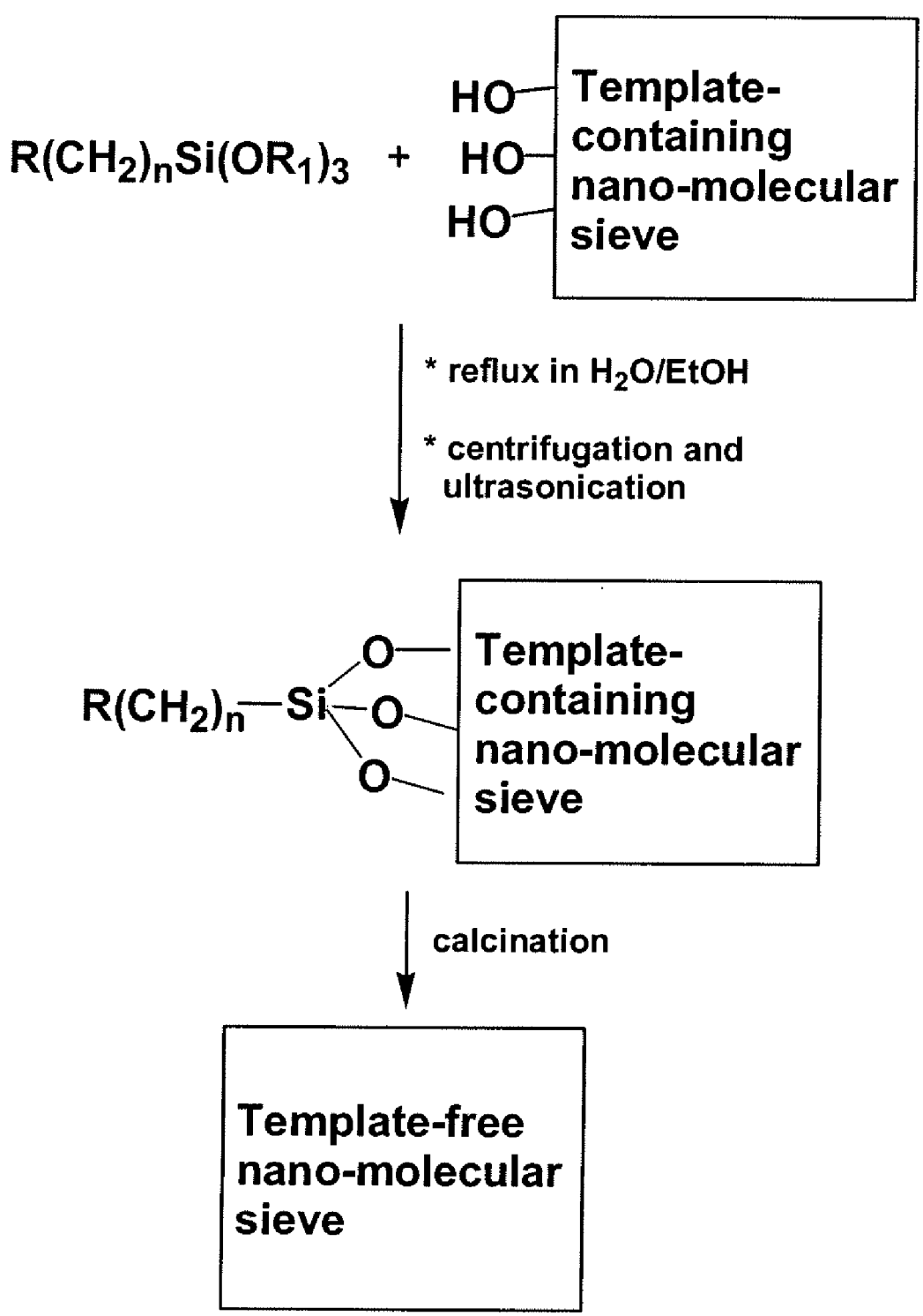
FIG. 1 shows the synthesis of template-free nano-molecular sieves using an organic ligand grafting-calcination method.

In our previous work, dispersible template-free nano-molecular sieves such as nano-Silicalite and nano-SAPO-34 were synthesized by an organic ligand-grafting-calcination method. The incorporation of the template-free nano-molecular sieves into a 1:1 weight ratio CA/CTA blend polymer matrix (cellulose acetate/cellulose triacetate) was investigated as a way to improve the gas separation properties (permeability of $CO_2$ and selectivity of $CO_2/CH_4$) of the CA/CTA polymer materials. The loading of the nano-molecular sieves in the nano-molecular sieve-polymer mixed matrix membranes (MMMs) was varied from 0 to 40 wt-%.

The permeability ($P_{CO2}$) and selectivity ($\alpha_{CO2/CH4}$) of some of the nano-molecular sieve-CA MMMs have been tested by pure gas measurements at 50° C. under 690 kPa (100 psig) single gas pressure. For all the gases tested ($N_2$, $H_2$, He, $CO_2$ and $CH_4$), MMMs containing PEG-nano-Silicalite, PEG-nano-SAPO-34, and nano-SAPO-34 show dramatically increased permeability (e.g., $P_{CO2}$ increase of 15 to 79%) over that of pure CA membrane. At the same time, the calculated ideal selectivity ($\alpha_{CO2/CH4}$) remained almost the same or only slight decreased. It has been confirmed that the significant increase in permeability is attributed to intrinsic gas transport properties and not to the defects in the films. In addition, the mechanical strength of the MMMs with up to 30 wt-% nano-molecular sieve loading is still strong enough to hold 690 kPa (100 psig) testing pressure.

These encouraging results suggest that PEG-nano-Silicalite, PEG-nano-SAPO-34, and nano-SAPO-34 are attractive additives for universally enhancing the gas permeability of CA without sacrificing $\alpha_{CO2/CH4}$. These results also indicate that the relative hydrophilicity of the nano-molecular sieves (such as the existence of PEG groups, Al, and P) plays a key role for enhancing the dispersity of the nano-molecular sieves in the CA polymer matrix and improving the adhesion between the nano-molecular sieves and the polymer. The $\alpha_{CO2/CH4}$ of nano-molecular sieve-CA MMMs (<22), however, is still not high enough for the next generation of membrane product for $CO_2$ removal from natural gas.

Therefore, the aim of the present invention is to prepare nano-molecular sieve-polymer MMMs to achieve higher $\alpha_{CO2/CH4}$ than that of CA membrane with equal or slightly lower $CO_2$ permeability, which is promising for practical application.

In this invention, we achieve higher $\alpha_{CO2/CH4}$ with equal or slightly lower $P_{CO2}$ compared to those of CA membrane ($P_{CO2}$=~8 barrers and $\alpha_{CO2/CH4}$=~22 at 50° C. and 690 kPa (100 psig)) taking advantage of the intrinsic gas transport properties of both appropriate nano-molecular sieves (or modified nano-molecular sieves) and polymer material (for example, some glassy polymers such as polyimides (PIs) and polyetherimides (PEIs) have much higher $\alpha_{CO2/CH4}$ than CA polymer, but their permeabilities are too low to be of commercial interest). PIs and PEIs are relatively hydrophobic glassy polymers. With the incorporation of nano-molecular sieves with suitable hydrophobicity, it is possible to increase the $P_{CO2}$ and maintain the high $\alpha_{CO2/CH4}$ of PI or PEI polymers, so that both the $\alpha_{CO2/CH4}$ and $P_{CO2}$ could be much higher than those of CA polymer material.

1) Preparation of MMMs

In this work, new nano-molecular sieve-polymer MMMs for $CO_2$ removal from natural gas have been prepared by incorporating dispersible template-free nano-molecular sieves into polymer matrices such as Matrimid 5218 polyimide matrix or Ultem 1000 polyetherimide matrix (Table 1). The nano-molecular sieves used in this invention include template-free nano-AlPO-18, nano-AlPO-14, nano-AlPO-34, nano-UZM-25, nano-CDS-1, nano-Nu-6(2), nano-AlPO-25, nano-AlPO-5, nano-Silicalite, and nano-SAPO-34. These dispersible template-free nano-molecular sieves were synthesized by an organic ligand-grafting-calcination method as shown in FIG. 1.

Figure 2:
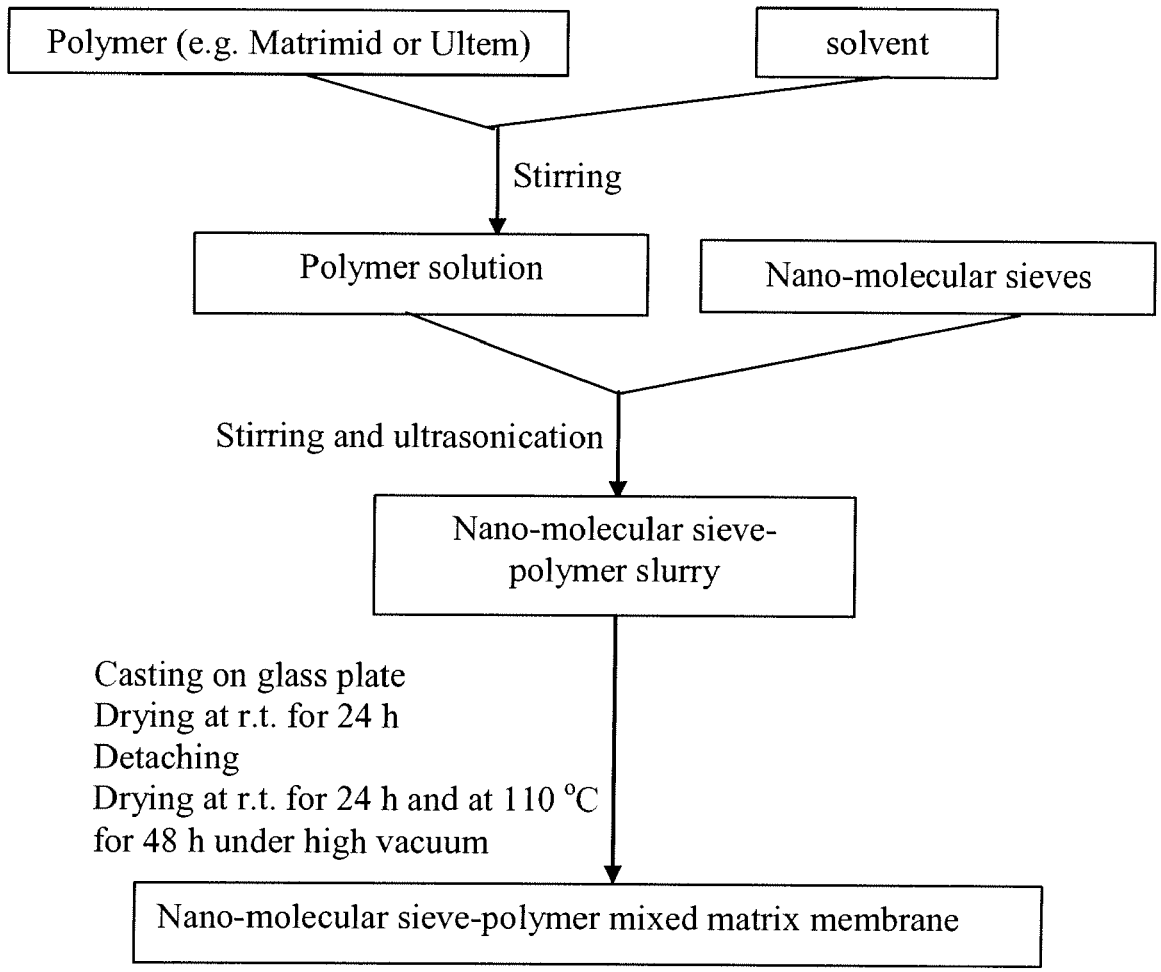
FIG. 2 shows a preparation flowchart of a nano-molecular sieve-polymer mixed matrix membrane.

MMMs were prepared from solution casting of template-free nano-molecular sieve particles dispersed in a solution of Matrimid 5218 or Ultem 1000 polymer (FIG. 2). The loading of the nano-molecular sieves in the MMMs is in a range of 5 wt-% to 70 wt-% (i.e., nano-molecular sieve/polymer=5 wt-%–70 wt-%). Matrimid 5218 or Ultem 1000 polymer was dissolved in an organic solvent such as methylene chloride or a mixture of several organic solvents at room temperature to form a homogeneous polymer solution. A measured amount of dry template-free nano-molecular sieves was then added, and the resulting slurry was stirred and ultrasonicated for three times to ensure good dispersion of the template-free nano-molecular sieves. The Matrimid 5218 or Ultem 1000 solution containing dispersed template-free nano-molecular sieves was poured into a glass ring on top of a clean glass plate, and dried at room temperature for 24 hours. The resulting dried MMMs were detached from the glass plate and were further dried at room temperature for at least 24 hours and then at 110° C. for at least 48 hours under high vacuum. The MMMs were around 1-3 mils thick, measured with a micrometer. They were cut into small circles for gas separation measurements.

2) MMM Gas Separation Tests

The permeabilities of $CO_2$ and $CH_4$ (P) and selectivity for $CO_2/CH_4$ ($\alpha_{CO2/CH4}$) of the nano-molecular sieve-polymer MMMs were measured by pure gas measurements at 50° C. under 690 kPa (100 psig) pressure.

For nano-AlPO-18-Ultem mixed matrix membrane (MMM) containing 40 wt-% of template-free nano-AlPO-18 molecular sieve particles, pure gas permeation test results (Table 2) showed simultaneously improved $CO_2/CH_4$ selectivity by 19% and $CO_2$ permeability by about 250% over the pure Ultem polymer membrane, indicating a successful combination of molecular sieving and sorption mechanism of nano-AlPO-18 molecular sieve fillers with solution-diffusion mechanism of Ultem polymer matrix in this nano-AlPO-18-Ultem MMM for $CO_2/CH_4$ separation.

For nano-SAPO-34-Ultem MMM film with 30 wt-% of nano-SAPO-34 loading, pure gas permeation tests (Table 2) show both improved $CO_2$ permeability (2.58 barrer) and $CO_2/CH_4$ selectivity (34.9) compared to the intrinsic $CO_2$ permeability (1.95 barrer) and $CO_2/CH_4$ selectivity (30.3) of the pure Ultem polymer matrix. For nano-Silicalite-Ultem MMM film with 30 wt-% of nano-Silicalite loading, pure gas permeation tests (Table 2) show significant enhancement by as much as 260% in $CO_2$ permeability over the intrinsic $CO_2$ permeability of the pure Ultem polymer matrix with equal $CO_2/CH_4$ selectivity. Both nano-Silicalite and nano-SAPO-34 can be uniformly dispersed in Matrimid and Ultem polymer matrices. However, nano-zeolite PEG-nano-Silicalite with hydrophilic PEG groups on their surfaces cannot disperse very well in either Matrimid or Ultem matrix. Pure gas permeation tests (Table 2) show increased $CO_2$ permeability (4.87 barrer), but the $CO_2/CH_4$ selectivity slightly decreased as compared to that of the pure Ultem polymer matrix. These results indicate that the compactibility and dispersity of the nano-molecular sieves with the polymer matrices plays a key role for the enhancement of gas separation properties of the MMMs. These encouraging selectivity and permeability enhancements prove the concept of MMM and confirm that MMM behavior is achievable with appropriate nano-molecular sieves.

Likewise, for nano-Silicalite-Matrimid and nano-SAPO-34-Matrimid MMMs with 30 wt-% of nano-Silicalite and nano-SAPO-34 loading, respectively, enhancements by as much as 93% in $CO_2$ permeability for nano-Silicalite-Matrimid and by as much as 69% in $CO_2$ permeability for nano-SAPO-34-Matrimid were observed with slightly increased $CO_2/CH_4$ selectivity compared to those of the pure Matrimid matrix (Table 3).

These nano-AlPO-18-Ultem, nano-SAPO-34-Ultem, nano-Silicalite-Ultem, nano-SAPO-34-Matrimid and nano-Silicalite-Matrimid MMMs have significantly improved performance with outstanding permeabilities and high $CO_2/CH_4$ selectivities compared to current Separex CA and CAP membranes (~22 $CO_2/CH_4$ selectivity) for $CO_2$ removal from natural gas, which makes them very promising membrane candidates for $CO_2$ removal from natural gas.

TABLE 1

Chemical structures and physical properties of Matrimid 5218 and Ultem 1000 polymers

| Polymer | Chemical structure | Density (g/cm³) | $T_g$ (°C.) |
|---|---|---|---|
| Matrimid 5218 | 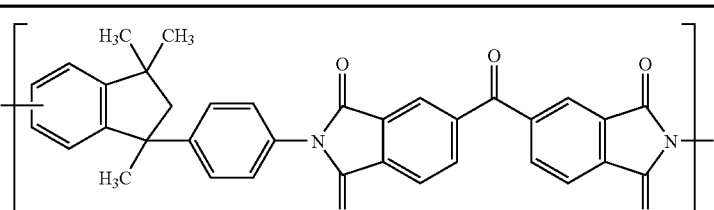 | 1.24 | 302 |
| Ultem 1000 | 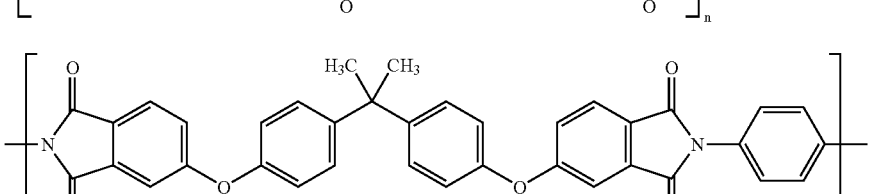 | 1.27 | 209 |

TABLE 2

Pure gas permeation properties of nano-molecular sieve-Ultem mixed matrix membranes using Ultem 1000 as polymer matrix*

| | Permeability (P, barrer) | | Selectivity | |
|---|---|---|---|---|
| Membrane | $P_{CO2}$ | $P_{CO2}$ increased | $P_{CH4}$ | $\alpha_{CO2/CH4}$ | $\alpha_{CO2/CH4}$ increased |
| Pure Ultem 1000 | 1.95 | 0 | 0.0644 | 30.3 | 0 |
| 40%-nano-AlPO-18-Ultem | 6.74 | 246% | 0.187 | 36.0 | 18.8% |
| 30%-nano-Silicalite-Ultem | 7.05 | 261% | 0.232 | 30.4 | 0.3% |
| 30%-PEG-nano-Silicalite-Ultem | 4.87 | 151% | 0.170 | 28.6 | −5.6% |
| 30%-nano-SAPO-34-Ultem | 2.58 | 32% | 0.0739 | 34.9 | 15.2% |

*Testing conditions: Pure gas permeation, 50° C., 690 kPa (100 psig); 1 barrer = $10^{-10}$ cm³(STP)·cm/cm²·sec·cmHg

TABLE 3

Pure gas permeation properties of nano-molecular sieve-Matrimid mixed matrix membranes using Matrimid 5218 as polymer matrix*

| | Permeability (P, barrer) | | Selectivity | |
|---|---|---|---|---|
| Membrane | $P_{CO2}$ | $P_{CO2}$ increased | $P_{CH4}$ | $\alpha_{CO2/CH4}$ | $\alpha_{CO2/CH4}$ increased |
| Pure Matrimid 5218 | 10.0 | 0 | 0.355 | 28.2 | 0 |
| 30%-nano-Silicalite-Matrimid | 19.3 | 93% | 0.663 | 29.1 | 3.2% |
| 30%-PEG-nano-Silicalite-Matrimid | 18.8 | 88% | 0.723 | 26.0 | −7.8% |
| 30%-nano-SAPO-34-Matrimid | 16.9 | 69% | 0.592 | 28.6 | 1.4% |

*Testing conditions: Pure gas permeation, 50° C., 690 kPa (100 psig); 1 barrer = $10^{-10}$ cm³(STP)·cm/cm²·sec·cmHg

The invention claimed is:

1. A method of manufacturing a membrane comprising:
   (a) selecting a quantity of one or more types of template-containing nano-molecular sieve particles;
   (b) functionalizing said template-containing nano-molecular sieve particles by grafting an organic functional group on an outer surface of said template-containing nano-molecular sieve particles using a functional organic linkage;
   (c) making template-free nano-molecular sieve particles by high temperature calcination of the said functionalized template-containing nano-molecular sieve particles;
   (d) forming a mixture by mixing 5 to 70 wt-% of said template-free nano-molecular sieve particles with a polyimide or polyetherimide polymer; and
   (e) making a membrane from said mixture.

2. The method of claim 1 wherein said nano-molecular sieve particles have a particle size from 5 to 1000 nm.

3. The method of claim 1 wherein said nano-molecular sieve particles are selected from the group consisting of nano-AlPO-18, nano-AlPO-14, nano-AlPO-34, nano-UZM-25, nano-CDS-1, nano-Nu-6(2), nano-AlPO-25, nano-AlPO-5, nano-Silicalite, and nano-SAPO-34.

4. The method of claim 1 wherein said functional organic linkage is an organosilane.

5. The method of claim 1 wherein said functional organic linkage is a compound having the formula $R(CH_2)_n Si(OR_1)_3$ in which R is an organic functional group, n is an integer from 1 to 20, and $R_1$ is a $C_1$-$C_8$ hydrocarbon group.

6. The method of claim 1 wherein said functional organic linkage is a compound having the formula $R(CH_2)_n SiR'(OR_1)_2$ in which R is an organic functional group, n is an integer from 1 to 20, $R_1$ is a $C_1$-$C_8$ hydrocarbon group, and R' is a $C_1$-$C_8$ hydrocarbon group.

7. The method of claim 1 wherein said functional organic linkage is a compound having the formula $R(CH_2)_n SiR'(R'')(OR_1)$ in which R is an organic functional group, n is an integer from 1 to 20, $R_1$ is a $C_1$-$C_8$ hydrocarbon group, R' is a $C_1$-$C_8$ hydrocarbon group, and R'' is a $C_1$-$C_8$ hydrocarbon group.

8. The method of claim 1 wherein said surface-functionalized molecular sieve nanoparticles are dispersible in organic solvents.

9. A mixed matrix membrane made by the method of claim 1.

* * * * *